(12) United States Patent
Hayashi

(10) Patent No.: US 10,792,738 B2
(45) Date of Patent: Oct. 6, 2020

(54) CUTTING TOOL AND METHOD OF MANUFACTURING MACHINED PRODUCT

(71) Applicant: KYOCERA CORPORATION, Kyoto-shi, Kyoto (JP)

(72) Inventor: Katsura Hayashi, Moriyama (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/320,149

(22) PCT Filed: Jul. 25, 2017

(86) PCT No.: PCT/JP2017/026907
§ 371 (c)(1),
(2) Date: Jan. 24, 2019

(87) PCT Pub. No.: WO2018/021335
PCT Pub. Date: Feb. 1, 2018

(65) Prior Publication Data
US 2019/0270150 A1     Sep. 5, 2019

(30) Foreign Application Priority Data
Jul. 26, 2016  (JP) .................................. 2016-146344

(51) Int. Cl.
*B23B 51/06*     (2006.01)
*B23C 5/28*     (2006.01)
(Continued)

(52) U.S. Cl.
CPC .............. *B23B 51/06* (2013.01); *B23B 51/00* (2013.01); *B23C 5/00* (2013.01); *B23C 5/10* (2013.01);
(Continued)

(58) Field of Classification Search
CPC ... B23B 51/06; B23B 51/042; B23B 2251/02; B23B 2251/50; B23B 51/00; B23C 5/28;
(Continued)

(56) References Cited

U.S. PATENT DOCUMENTS 1,746,716 A    2/1930 Sasse
2,986,960 A *  6/1961 Oxford, Jr. ............. B23P 15/32
                                                    408/59
(Continued)

FOREIGN PATENT DOCUMENTS

JP    S6362604 A    3/1988
JP    H01140909 A   6/1989
(Continued)

*Primary Examiner* — Eric A. Gates
*Assistant Examiner* — Chwen-Wei Su
(74) *Attorney, Agent, or Firm* — Viering, Jentschura & Partner MBB

(57) ABSTRACT

A cutting tool may include a circular columnar body extending from a first end to a second end along a rotation axis. At least a part of the columnar body may correspond to an insert including a cutting edge at the first end. The insert may include therein a flow path extending from a side of the first end toward a side of the second end. A width of the flow path along a radial direction of the circular columnar body may be smaller than a width of the flow path along a circumferential direction of the circular columnar body in a cross section orthogonal to the rotation axis.

15 Claims, 17 Drawing Sheets

(51) Int. Cl.
  *B23D 77/00* (2006.01)
  *B23C 5/10* (2006.01)
  *B23C 5/00* (2006.01)
  *B23B 51/00* (2006.01)

(52) U.S. Cl.
  CPC ............... *B23C 5/28* (2013.01); *B23D 77/00* (2013.01); *B23D 77/006* (2013.01); *B23B 2251/02* (2013.01)

(58) Field of Classification Search
  CPC .......... B23C 5/00; B23C 5/10; B23D 77/006; B23D 77/00; Y10T 408/45; Y10T 408/455; Y10T 407/14
  See application file for complete search history.

(56) References Cited

U.S. PATENT DOCUMENTS

| | | | | |
|---|---|---|---|---|
| 3,085,453 | A * | 4/1963 | Mossberg | B23B 51/06 76/108.1 |
| 4,826,364 | A | 5/1989 | Grunsky | |
| 4,968,193 | A * | 11/1990 | Chaconas | C11D 3/0063 408/211 |
| 5,541,006 | A | 7/1996 | Conley | |
| 5,697,046 | A | 12/1997 | Conley | |
| 6,551,035 | B1 * | 4/2003 | Bruhn | B23B 31/11 408/144 |
| 7,393,162 | B2 * | 7/2008 | Hecht | B23B 51/0486 408/1 R |
| 8,318,063 | B2 * | 11/2012 | Mirchandani | B21C 23/22 264/125 |
| 9,216,460 | B2 * | 12/2015 | Matsuda | B23B 51/06 |
| 2005/0244235 | A1 | 11/2005 | Kleiner | |
| 2005/0244236 | A1 | 11/2005 | Bosman | |
| 2006/0006576 | A1 * | 1/2006 | Karos | B21C 23/147 264/209.2 |
| 2007/0065243 | A1 | 3/2007 | Bosman | |
| 2013/0223943 | A1 | 8/2013 | Gey et al. | |

FOREIGN PATENT DOCUMENTS

| | | |
|---|---|---|
| JP | H10511432 A | 11/1998 |
| JP | 2006510492 A | 3/2006 |
| JP | 2006510494 A | 3/2006 |
| JP | 2008546554 A | 12/2008 |
| WO | 2007001870 A2 | 1/2007 |

* cited by examiner

CUTTING TOOL AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/026907 filed on Jul. 25, 2017, which claims priority to Japanese Application No. 2016-146344 filed on Jul. 26, 2016, which are entirely incorporated herein by reference.

TECHNICAL FIELD

The present disclosure relates to cutting tools for use in a drilling process or the like.

BACKGROUND

As a cutting tool for use in a drilling process carried out on metal, a cutting tool is discussed in, for example, Japanese Unexamined Patent Publication No. 2008-546554 (Patent Document 1). The cutting tool discussed in Patent Document 1 may include a first region and a second region that are different in composition, and a coolant flow path (flow path) located at a boundary between these regions.

The flow path in a cross section orthogonal to a rotation axis may have a circular shape in the cutting tool discussed in Patent Document 1. When the cross section of the flow path is increased to supply a greater amount of a coolant to the flow path, a thickness of a central part of the cutting tool, which is called a core thickness, may be decreased and durability of the cutting tool may be lowered. The cutting tool needs therefore to be excellent in durability while including a configuration for supplying the coolant.

The present disclosure takes into consideration the above problems, and is intended to provide cutting tools having excellent durability while including a configuration for supplying a coolant.

SUMMARY

In a non-limiting aspect of the present disclosure, a cutting tool may include a circular columnar body extending from a first end to a second end along a rotation axis. At least a part of the circular columnar body may correspond to an insert including a cutting edge at the first end. The insert may include therein a flow path extending from a side of the first end toward a side of the second end. A width of the flow path along a radial direction of the circular columnar body may be smaller than a width of the flow path along a circumferential direction of the circular columnar body in a cross section orthogonal to the rotation axis.

DETAILED DESCRIPTION

<Cutting Tool>

Figure 1:
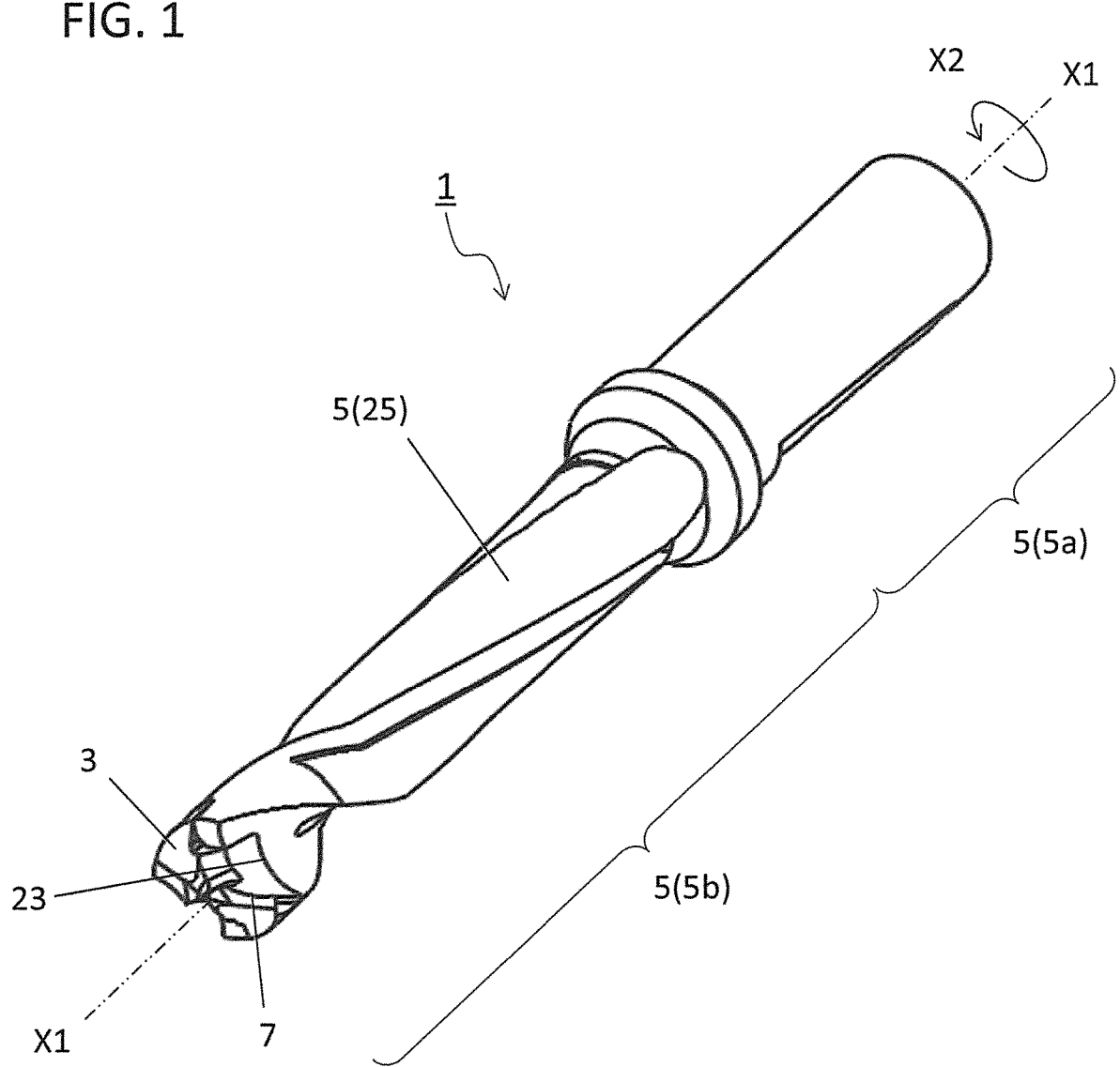
FIG. 1 is a perspective view illustrating a cutting tool a non-limiting aspect of the present disclosure.

Cutting tools in various non-limiting aspects of the present disclosure are respectively described in detail below with reference to the drawings. For the sake of description, each of the drawings referred to in the following illustrates, in a simplified form, only main members necessary for describing the embodiments. Hence, cutting tools disclosed below are capable of including an arbitrary structural member not illustrated in the drawings referred to. Dimensions of the members in each of the drawings are not ones which faithfully represent dimensions of actual structural members and dimension ratios of these members.

Figure 2:
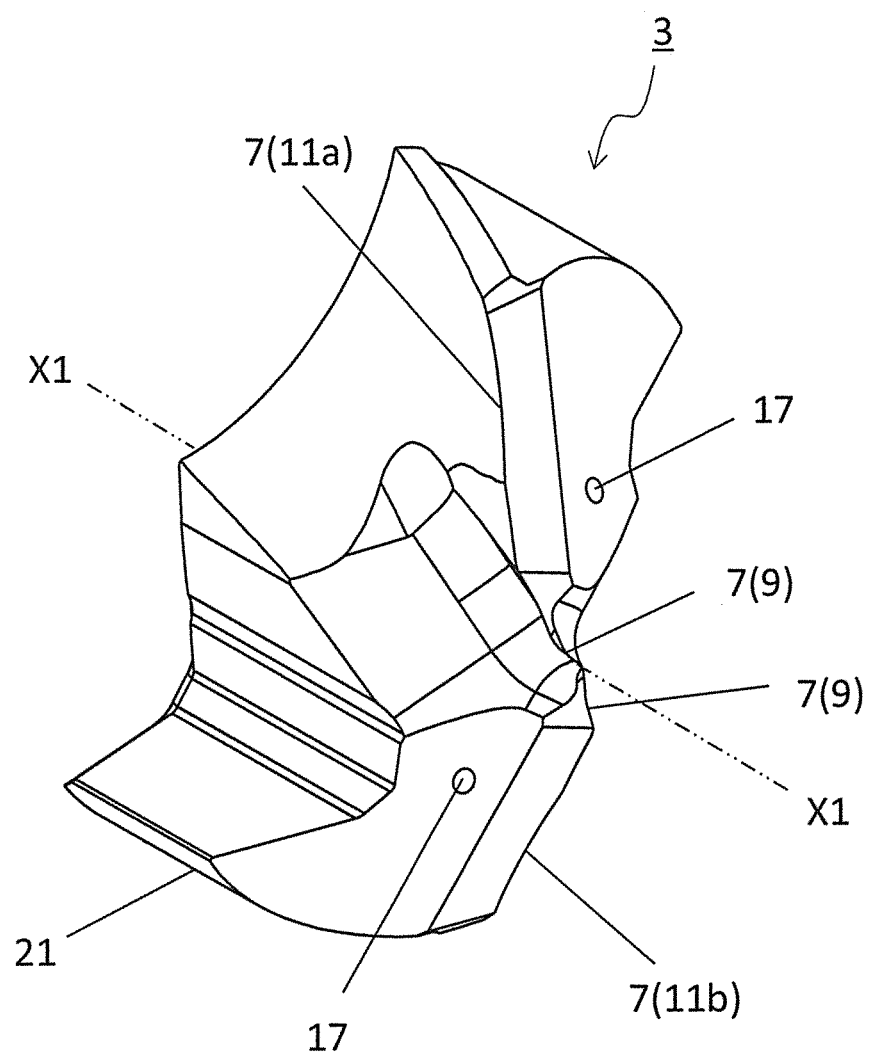
FIG. 2 is a perspective view illustrating an insert a non-limiting aspect of the present disclosure.
Figure 3:
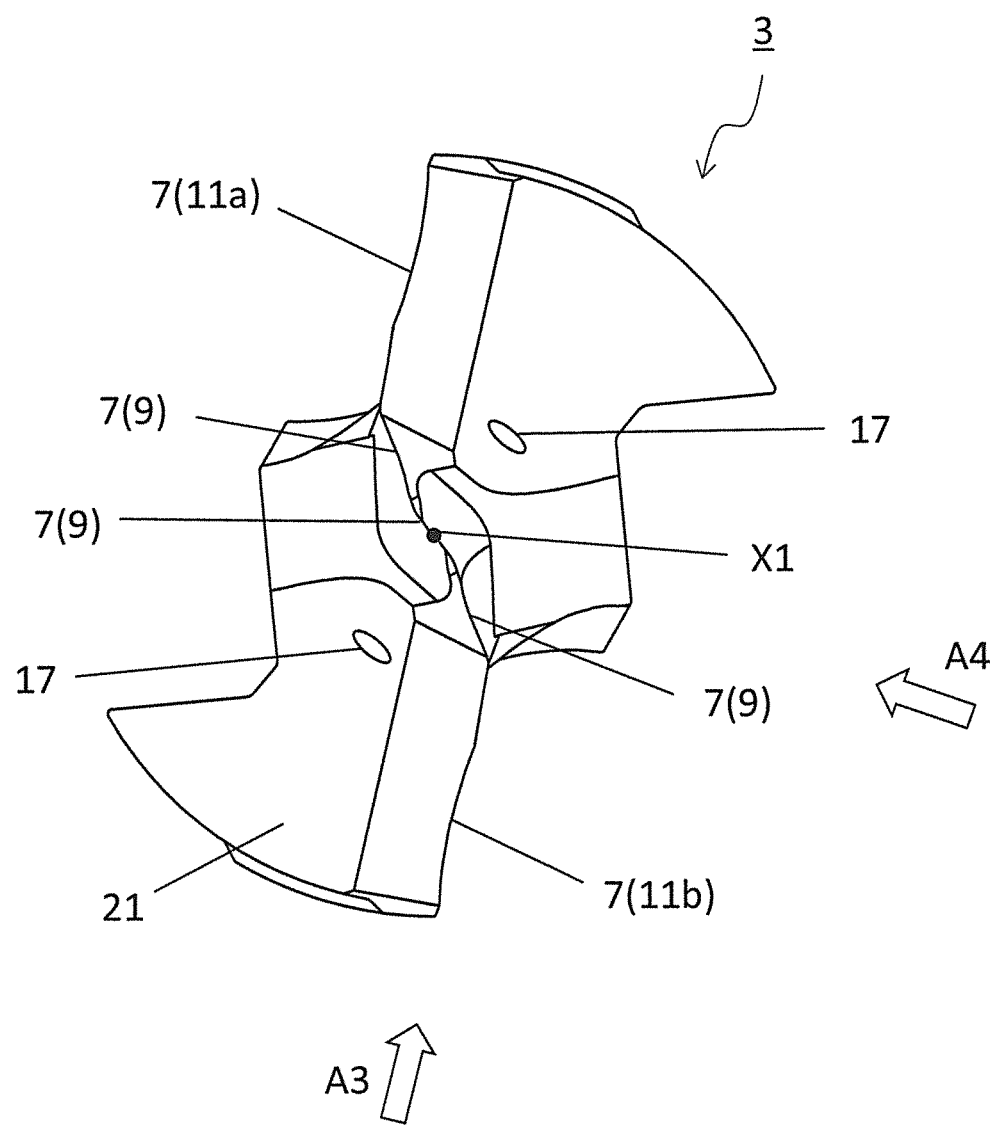
FIG. 3 is a front view of the insert illustrated in FIG. 2 as viewed toward a first end.

The cutting tool 1 of a non-limiting aspect of the present disclosure has a columnar body extending from a first end to a second end along a rotation axis X1 as illustrated in FIG. 1. The columnar body is a circular columnar body in a non-limiting aspect of the present disclosure. The columnar body in a non-limiting aspect of the present disclosure includes an insert 3 located at a side of the first end, and a holder 5 located at a side of the second end with respect to the insert 3. A cutting edge 7 is located at a side of the first end in the insert 3. That is, at least a part of the circular columnar body extending from the first end to the second end along the rotation axis X1 corresponds to the insert 3 including a cutting edge at the first end. The cutting edge 7 includes a first cutting edge 9 and a second cutting edge 11 as illustrated in FIGS. 2 and 3.

The cutting tool 1 in a non-limiting aspect of the present disclosure is a so-called indexable insert drill (hereinafter also referred to "drill 1"). In the step of cutting out a workpiece for manufacturing a machined product, the drill 1 is rotated around the rotation axis X1. Arrow X2 in FIG. 1 and the like indicates a rotation direction of the drill 1.

For the sake of convenience, one in a direction along the rotation axis X1 is taken as "a first end," and the other in the direction along the rotation axis X1 is taken as "a second end." A side of one end in a member that becomes an object is taken as "a side of a first end, and a side of the other end in the member that becomes the object is taken as "a side of a second end." During use of the drill 1, in general, the first end is called "a front end" and the second end is called "a rear end."

The insert 3 constituting the drill 1 is first described in detail.

The insert 3 functions as a cutting part in the drill 1. Specifically, the insert 3 is a part which has a major role in a cutting process of a workpiece, and which is, in other words, a part brought into contact with the workpiece.

Figure 5:
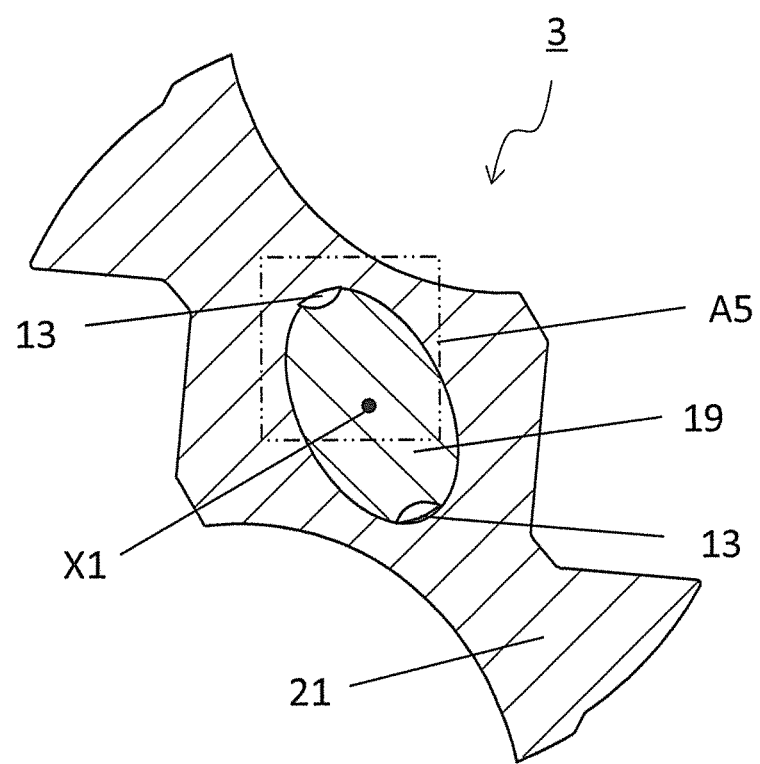
FIG. 5 is a sectional view taken along line B1-B1 in the insert illustrated in FIG. 4.
Figure 6:
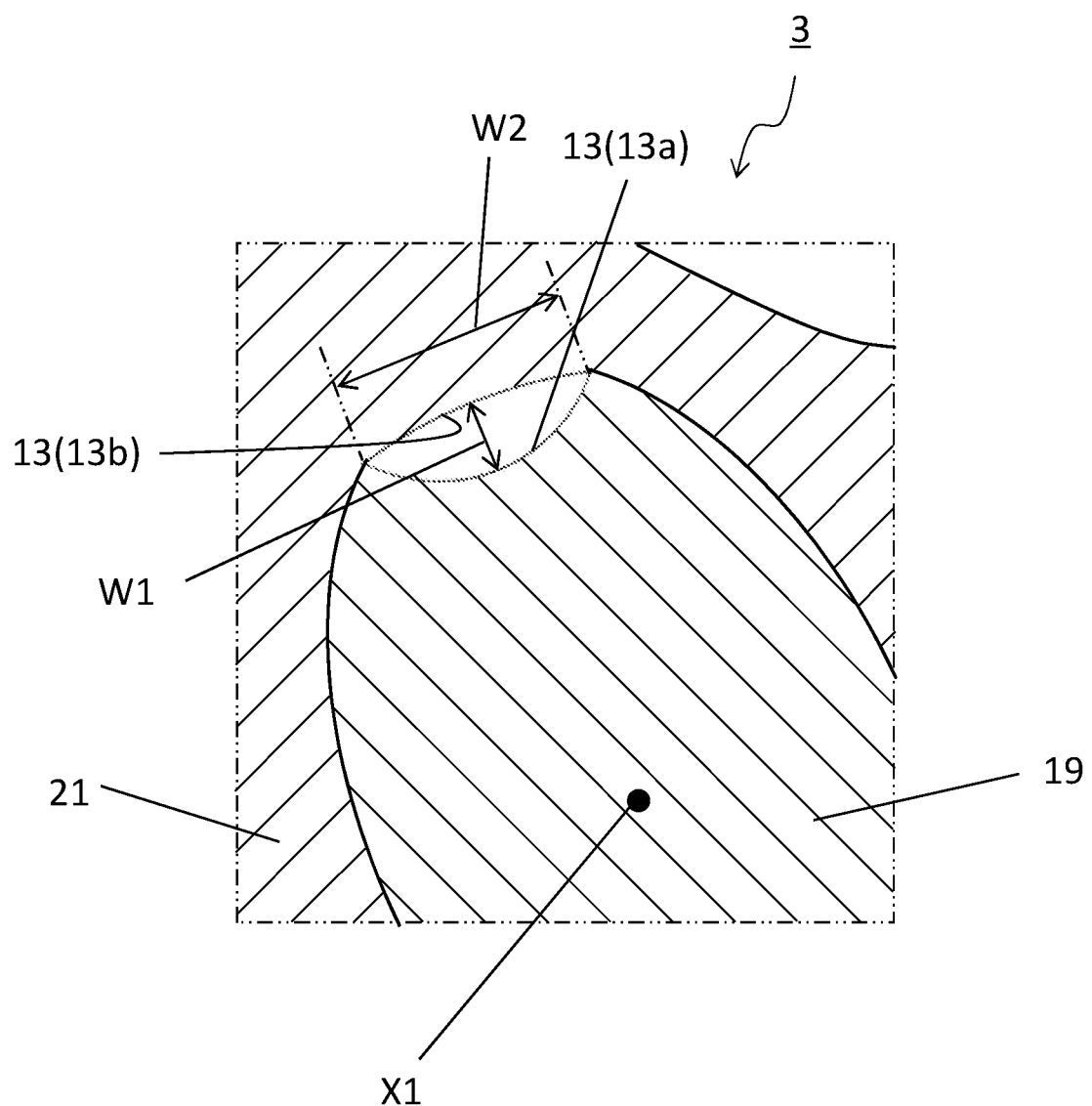
FIG. 6 is an enlarged sectional view of a region A5 in FIG. 5.
Figure 7:
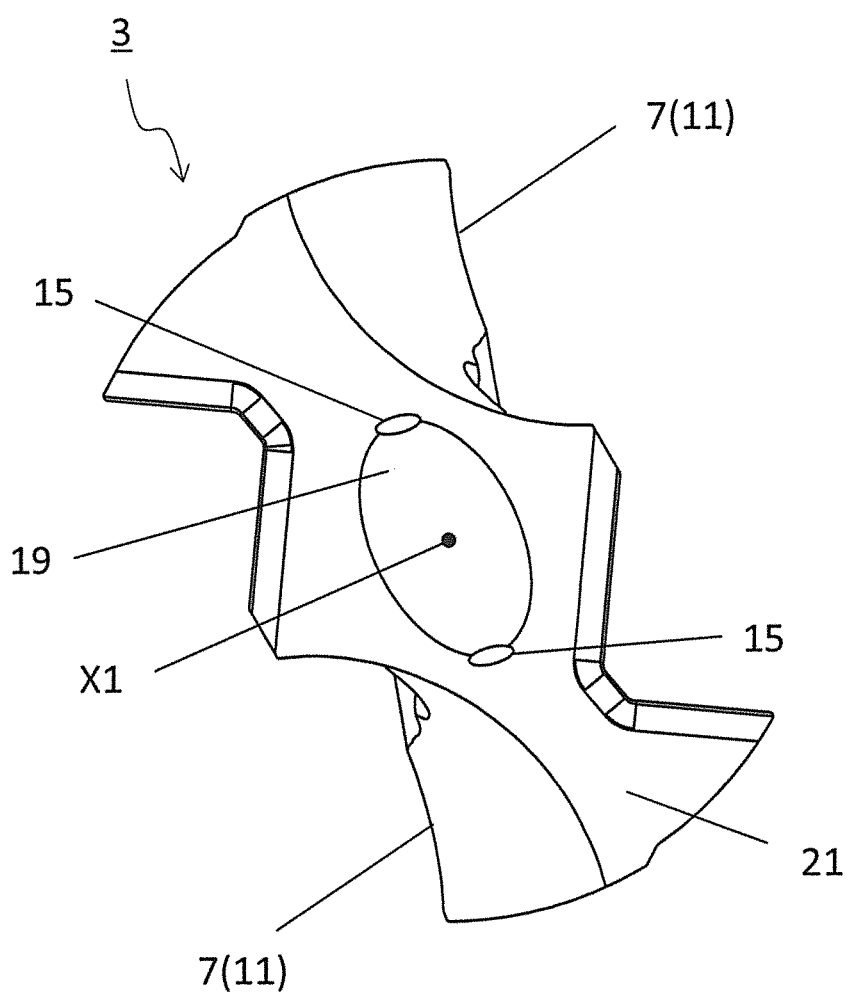
FIG. 7 is a rear view of the insert illustrated in FIG. 2 as viewed from a side of a second end.

As illustrated in FIGS. 5, 6, and the like, the insert 3 includes therein a first flow path 13 used for passing a coolant therethrough. The first flow path 13 extends from a side of the first end toward a side of the second end in the insert 3. A first inlet port 15 opens at a side of the second end as illustrated in FIG. 7 that is a rear view as viewed from a side of the second end in a non-limiting aspect of the present disclosure. A first outlet port 17 opens at a side of the first end in the insert 3 as illustrated in FIGS. 2, 3, and the like.

The coolant entered from the first inlet port 15 passes through the first flow path 13 and is then injected from the first outlet port 17 to the outside of the insert 3. The coolant is usable for cooling the drill 1 and the workpiece. The coolant is designed to be injected outward from the first outlet port 17 located at a flank surface connecting to the cutting edge 7 in order to cool the cutting edge 7 in the drill 1 in a non-limiting aspect of the present disclosure.

Figure 9:
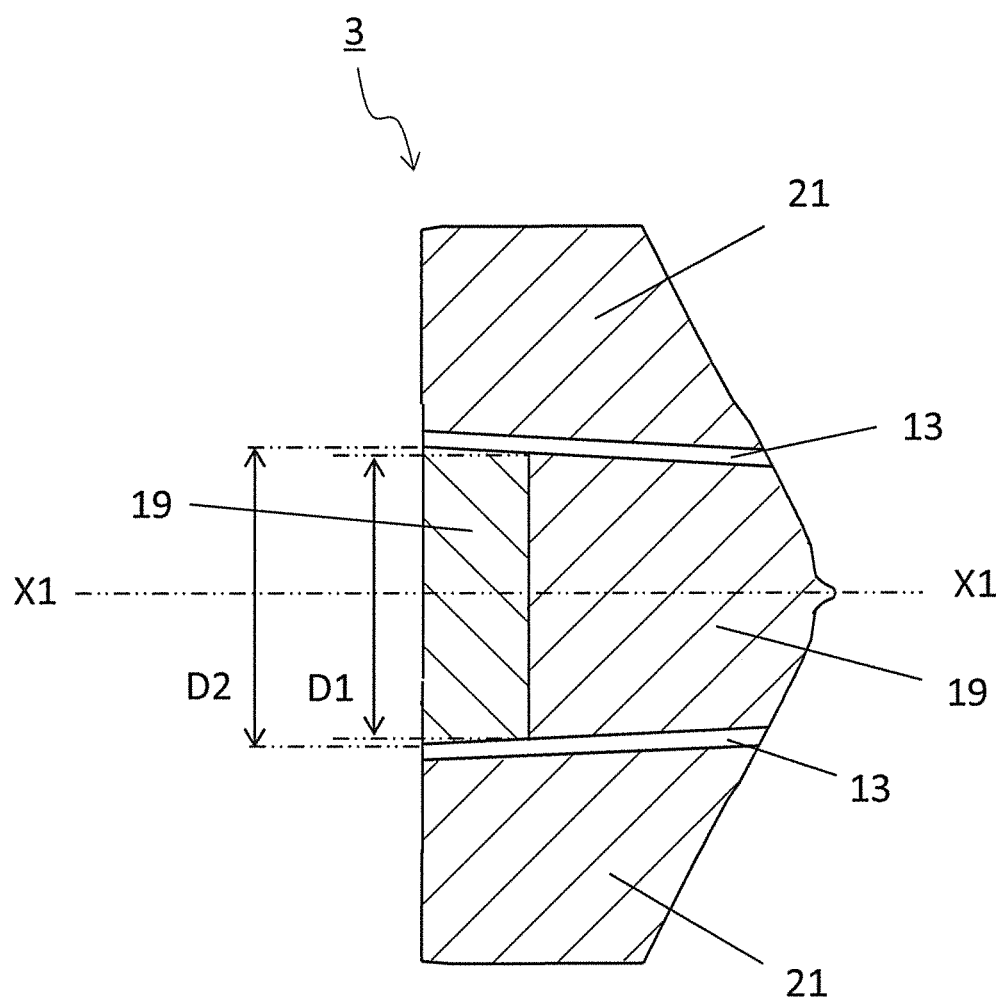
FIG. 9 is a sectional view taken along line B2-B2 in the insert illustrated in FIG. 8.

The first flow path 13 may extend straight in a straight line shape from a side of the first end toward a side of the second end in the insert 3. Alternatively, at least a part of the first flow path 13 may extend in a curved shape. As illustrated in FIG. 9, the first flow path 13 extends in the straight line shape in a non-limiting aspect of the present disclosure.

A width of the first flow path 13 in a radial direction of the rotation axis X1 is smaller than a width of the first flow path 13 in a circumferential direction of the rotation axis X1 in a cross section orthogonal to the rotation axis X1 in the insert 3 of a non-limiting aspect of the present disclosure. Specifically, a width W1 of the first flow path 13 in the radial direction of the rotation axis X1 is smaller than a width W2 of the first flow path 13 in the circumferential direction of the rotation axis X1 as illustrated in FIG. 6.

With the first flow path 13 having the above configuration, a cross-sectional area of the first flow path 13 can be increased while ensuring a large core thickness of the insert 3. This leads to enhanced strength of the insert 3 and highly efficient cooling of the cutting edge 7. One or a plurality of the first flow paths 13 may be included. There are the two first flow paths 13 in a non-limiting aspect of the present disclosure.

The cutting edge 7 is located at a side of the first end in the columnar body, in other words, a side of the first end in the insert 3 as illustrated in FIGS. 1 and 2, or the like. The cutting edge 7 passes through the rotation axis X1 when viewed from a side of the first end, and has a 180-degree rotationally symmetric shape on the basis of the rotation axis X1. The cutting edge 7 includes a first cutting edge 9 and a pair of second cutting edges 11 in a non-limiting aspect of the present disclosure. The second cutting edges 11 respectively connect to two end portions of the first cutting edge 9. Therefore, one second cutting edge 11a, the first cutting edge 9, and the other second cutting edge 11b are arranged in order as illustrated in FIG. 3.

The first cutting edge 9 is a portion which passes through the rotation axis X1 when viewed from a side of the first end, and which is generally called "a chisel edge." The pair of second cutting edges 11 are portions which respectively connect to the end portions of the first cutting edge 9, and which are called "major cutting edges" that mainly cut out a workpiece during a cutting process.

The pair of second cutting edges 11 used as the major cutting edges are formed at a ridge part where two surfaces intersect with each other. Of these two surfaces, the surface located at a side of the first end is a so-called "flank surface." Of these two surfaces, the surface located at a side of the second end is a so-called "rake surface." It can therefore be said that the major cutting edge is formed at a ridge part where the flank surface intersects with the rake surface. Chips of the workpiece cut out by the major cutting edge pass through the rake surface. Because the two major cutting edges are included in a non-limiting aspect of the present disclosure, the two rake surfaces are also included therein.

Although the configuration including the first cutting edge 9 and the pair of second cutting edges 11 is illustrated above as a specific configuration of the cutting edge 7, the configuration of the cutting edge 7 is not limited thereto. For example, the cutting edge 7 may be constituted only by the second cutting edges 11 without including the first cutting edge 9.

A non-limiting aspect of the present disclosure includes the two second cutting edges 11, and the two first flow paths 13 for respectively cooling the two second cutting edges 11. This leads to efficient cooling of the two second cutting edges 11. The number of the first flow paths 13 may differ from the number of the second cutting edges 11, but may be equal to the number of the second cutting edges 11.

Figure 4:
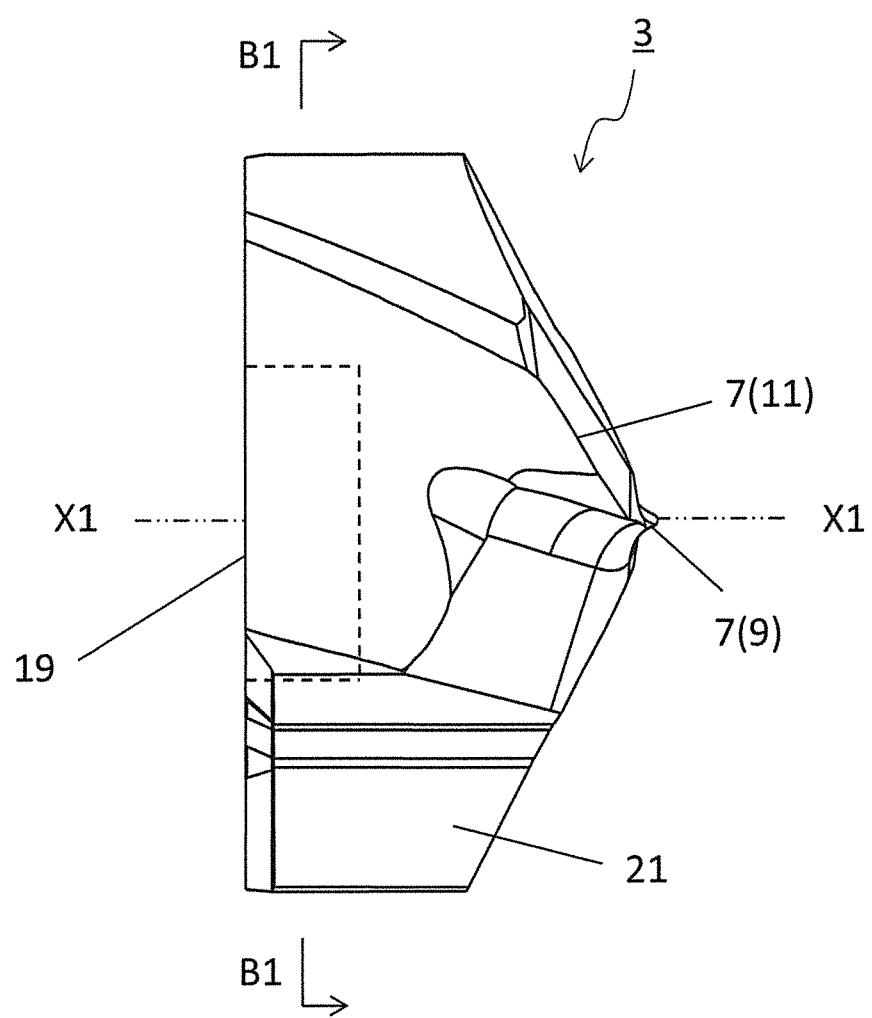
FIG. 4 is a side view of the insert illustrated in FIG. 3 as viewed from the direction A3.
Figure 8:
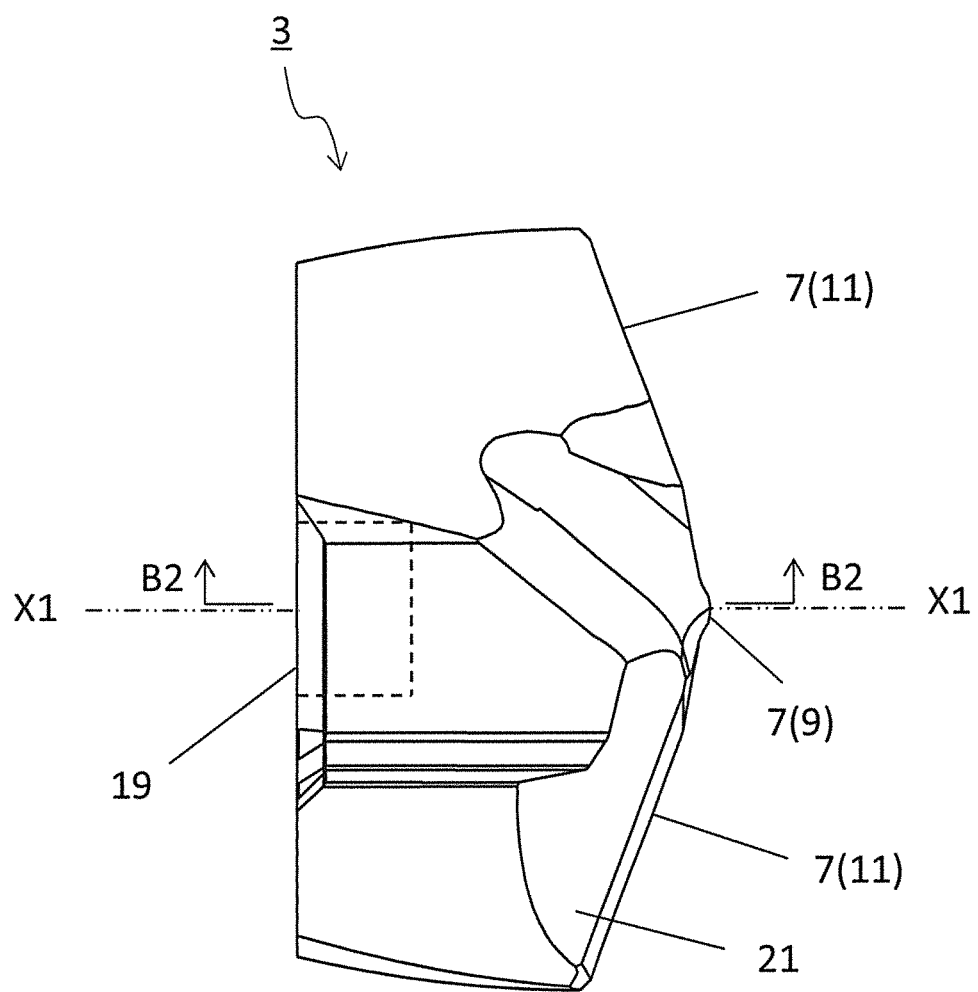
FIG. 8 is a side view of the insert illustrated in FIG. 3 as viewed from the direction A4.

The insert 3 may be constituted by one or a plurality of members. The insert 3 in a non-limiting aspect of the present disclosure is constituted by two members of a first region 19 and a second region 21. An existing position of the first region 19 is indicated by a broken line in FIGS. 4 and 8. The first region 19 includes the rotation axis X1 and is located along the rotation axis X1. The second region 21 covers at least a part of the first region 19.

For example, metal, cemented carbide, or cermet is usable as a material constituting the first region 19. Examples of the metal include stainless steel and titanium. Examples of compositions of the cemented carbide include WC(tungsten carbide)-Co(cobalt), WC—TiC(titanium carbide)-Co, and WC—TiC—TaC(tantalum carbide)-Co.

Here, WC, TiC, and TaC are hard particles, and Co is a binder phase. The cermet is a sintered composite material obtainable by compositing metal into a ceramic ingredient. A specific example of the cermet is one which is composed mainly of a titanium compound, such as titanium carbide (TiC) or titanium nitride (TiN).

Examples of material constituting the second region 21 include diamond sintered body, CBN (Cubic Boron Nitride), cemented carbide, and cermet. Examples of the cemented carbide and the cermet are similar to those described as the material constituting the first region 19.

The same material or different materials may be used for the first region 19 and the second region 21. For example, the second region 21 including the cutting edge 7 located at a side of the first end may be constituted by a high hardness material, such as cemented carbide. The first region 19 may be constituted by a material having good thermal conductivity, for example, metal such as titanium.

The second region 21 is joined to the first region 19. The term "joined" is a concept including not only cases where two members are adhered with an adhesive, such as solder and resin, but also cases where the two members are directly joined together, such as cases where the two members are welded together or deposited together.

Each of the first flow paths 13 in a non-limiting aspect of the present disclosure includes a curved surface part in a cross section orthogonal to the rotation axis X1 as illustrated in FIGS. 5 and 6. When the first flow path 13 includes the curved surface part, it is easy for the coolant to flow through the first flow path 13. This contributes to enhancing an injection pressure of the coolant injected from the first outlet port 17 to the outside. The first flow path 13 in a non-limiting aspect of the present disclosure has a shape curved along the circumferential direction of the rotation axis X1. Thus, when the first flow path 13 has the shape curved along the circumferential direction of the rotation axis X1, it becomes easier to ensure a larger core thickness of the insert 3 by ensuring a flow path area.

Figure 10:
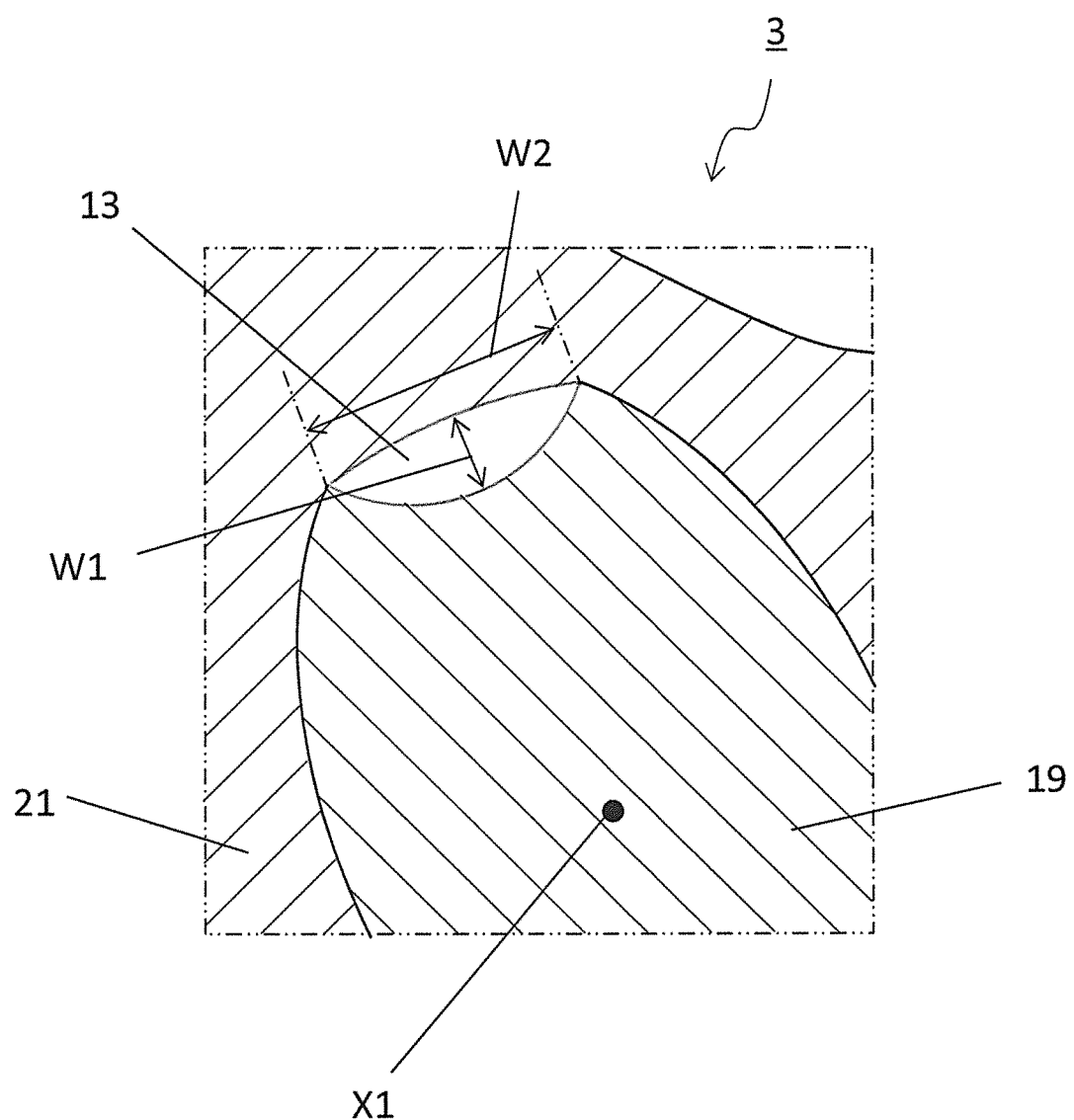
FIG. 10 is a sectional view of another non-limiting aspect of the present disclosure of the insert illustrated in the same manner as FIG. 6.
Figure 11:
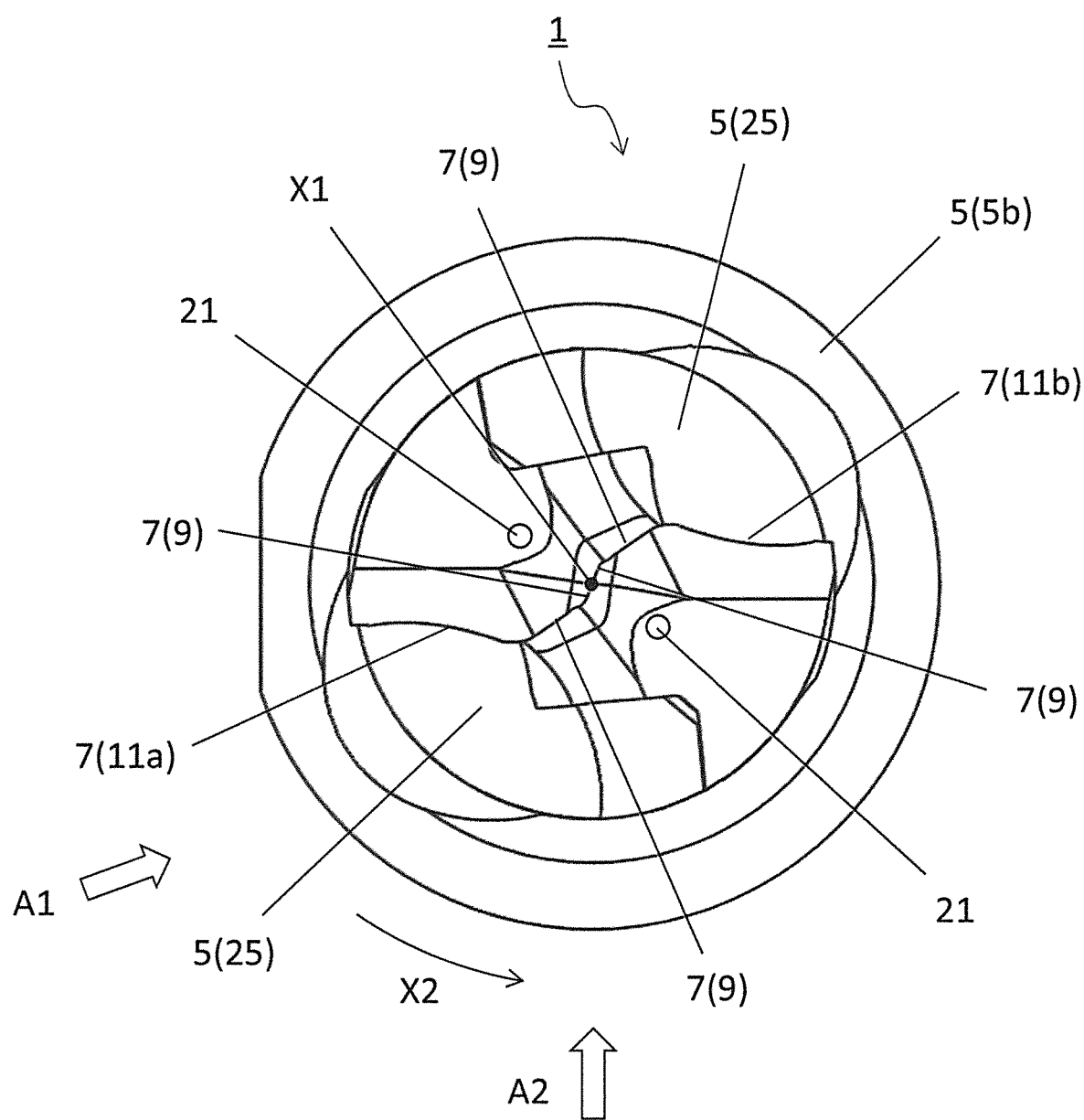
FIG. 11 is a front view of the cutting tool illustrated in FIG. 1 as viewed toward the first end.
Figure 12:
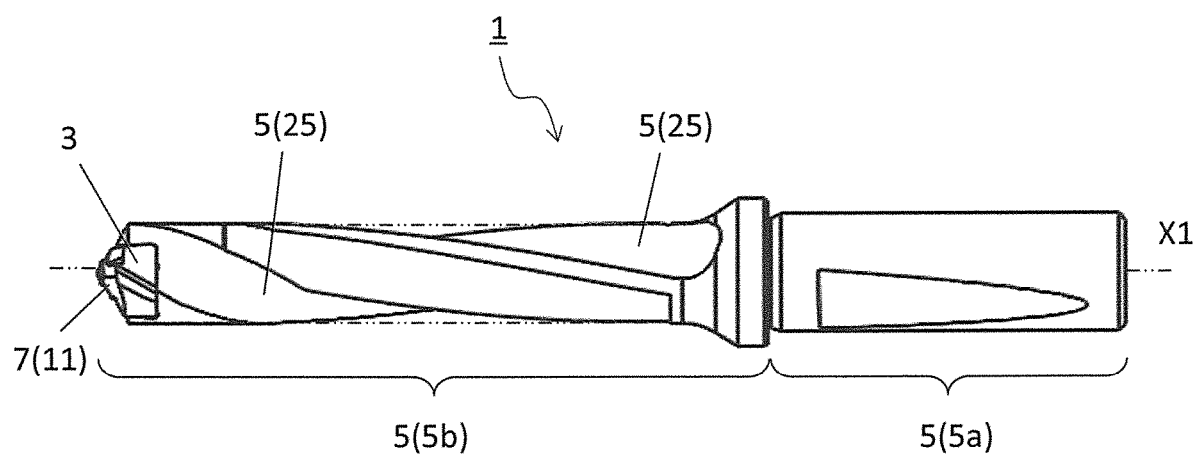
FIG. 12 is a side view of the cutting tool illustrated in FIG. 11 as viewed from the direction A1.
Figure 13:
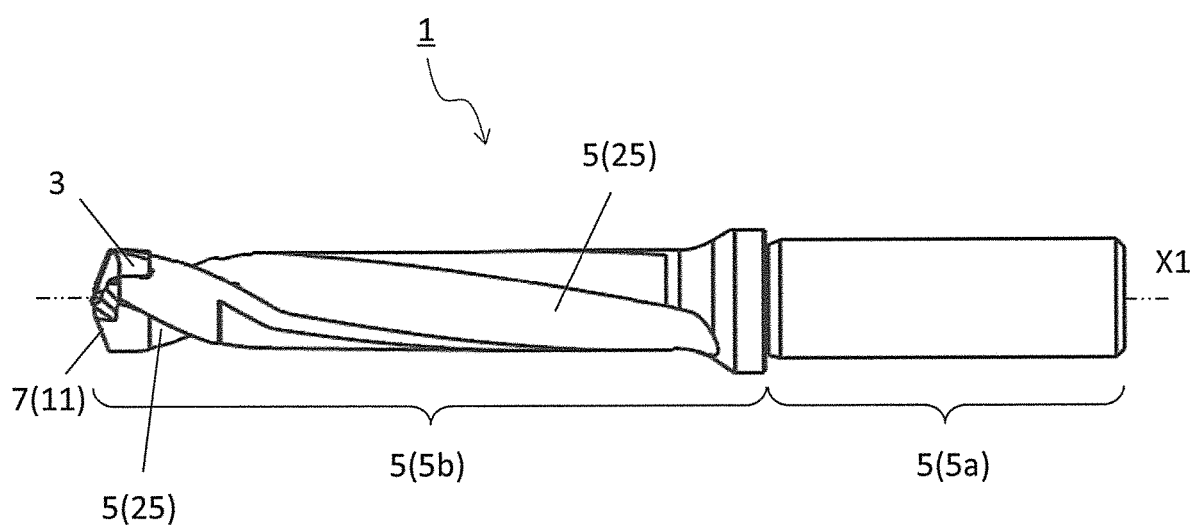
FIG. 13 is a side view of the cutting tool illustrated in FIG. 11 as viewed from the direction A2.

The shape of the first flow path 13 in the cross section orthogonal to the rotation axis X1 may be a shape as illustrated in FIG. 10, instead of the shape described above. FIG. 10 illustrates another non-limiting aspect of the present disclosure of the first flow path 13.

Similarly to the insert 3 illustrated in FIG. 6, the insert 3 illustrated in FIG. 10 includes a first region 19 and a second region 21, and a first flow path 13 is located between the first region 19 and the second region 21. Here, a contour of the first flow path 13 in the first region 19 may be greater than a contour thereof in the second region 21 in the cross section orthogonal to the rotation axis X1. When satisfying this configuration, the first region 19 is located more inward than the second region 21 and heat is therefore less likely to be released from the first region 19 than from the second region 21. With this configuration, heat accumulated in the first region 19, which is less likely to be released to the outside, can efficiently be released through the first flow path 13 to the outside.

In the cross section orthogonal to the rotation axis X1, a surface of the first flow path 13 includes a first portion 13a located inside and having a concave curved surface shape, and a second portion 13b located more outside than the first portion and having a concave curved surface shape. A radius of curvature of the first portion 13a may be smaller than a radius of curvature of the second portion 13b.

When the first flow path 13 has the above configuration, the contour of the first flow path 13 in the first region 19 can be increased than the contour of the first flow path 13 in the second region 21 without an excessive enlargement of the first flow path 13. The heat can therefore be efficiently released to the outside while enhancing durability of the insert 3.

The insert 3 in a non-limiting aspect of the present disclosure includes the first region 19 and the second region 21. As illustrated in FIG. 9, the first region 19 may be configured so that an outer diameter D2 at a side of the second end is greater than an outer diameter D1 at a side of the first end. When satisfying this configuration, it is possible to increase a joining area of the first region 19 and the second region 21.

For example, when the first flow path 13 is located between the first region 19 and the second region 21 as in the insert 3 in a non-limiting aspect of the present disclosure, it becomes easy for a position of the first outlet port 17 to more approach the rotation axis X1 than a position of the first inlet port 15. Thereby, the position of the first outlet port 17 can be brought near the rotation axis X1 while ensuring a core thickness. This leads to efficient cooling of a part of the cutting edge 7 located close to the rotation axis X1.

Alternatively, an outer diameter of the first region 19 may increase as going from a side of the first end toward a side of the second end. When the first region 19 is configured as described above, the joining area of the first region 19 and the second region 21 can be increased while ensuring that the first region 19 has a simple configuration and is manufacturable easily.

Additionally, when the first flow path 13 is located between the first region 19 and the second region 21, the position of the first outlet port 17 can be brought near the rotation axis X1 without a significant decrease in injection pressure of the coolant in the first flow path 13. This leads to more efficient cooling of the part of the cutting edge 7 located close to the rotation axis X1.

As described earlier, the insert 3 in a non-limiting aspect of the present disclosure includes the two first flow paths 13. The two first flow paths 13 in a non-limiting aspect of the present disclosure are located at opposite sides on the basis of the rotation axis X1. In other words, the insert 3 includes the pair of first flow paths 13 located point symmetrically on the basis of the rotation axis X1.

Alternatively, the pair of first flow paths 13 may respectively approach the rotation axis X1 as going from a side of the second end toward a side of the first end. In other words, a distance between the pair of first flow paths 13 at the side of the first end may be smaller than that at the side of the second end. When the pair of first flow paths 13 has the above configuration, the position of the first outlet port 17 can be brought near the rotation axis X1 while ensuring the core thickness. This leads to efficient cooling of the part of the cutting edge 7 located close to the rotation axis X1.

The first region 19 may have a smaller outer diameter at a side of the first end than at a side of the second end, and the second region 21 may have a constant outer diameter from the side of the second end toward the side of the first end in a part including the first region 19 in a direction along the rotation axis X1. When satisfying this configuration, an outer diameter of the insert 3 at the side of the second end can be ensured, and it is therefore easy to ensure the core thickness of the insert 3, thus leading to enhanced durability thereof.

Additionally, when the second region 21 including the cutting edge 7 located at the first end is composed of a material having higher hardness than that of the first region 19, a large thickness of the second region 21 at the first end can be ensured, thereby enhancing durability of the cutting edge 7.

The above term "the constant outer diameter" does not imply a strictly constant outer diameter but includes cases where there are slight variations in outer diameter. Specifically, there are cases where the outer diameter at the side of the first end in the second region 21 is different from the outer diameter at the side of the second end in the second region 21 by approximately ±5%.

The holder 5 constituting the drill 1 is then described in detail below.

Figure 14:
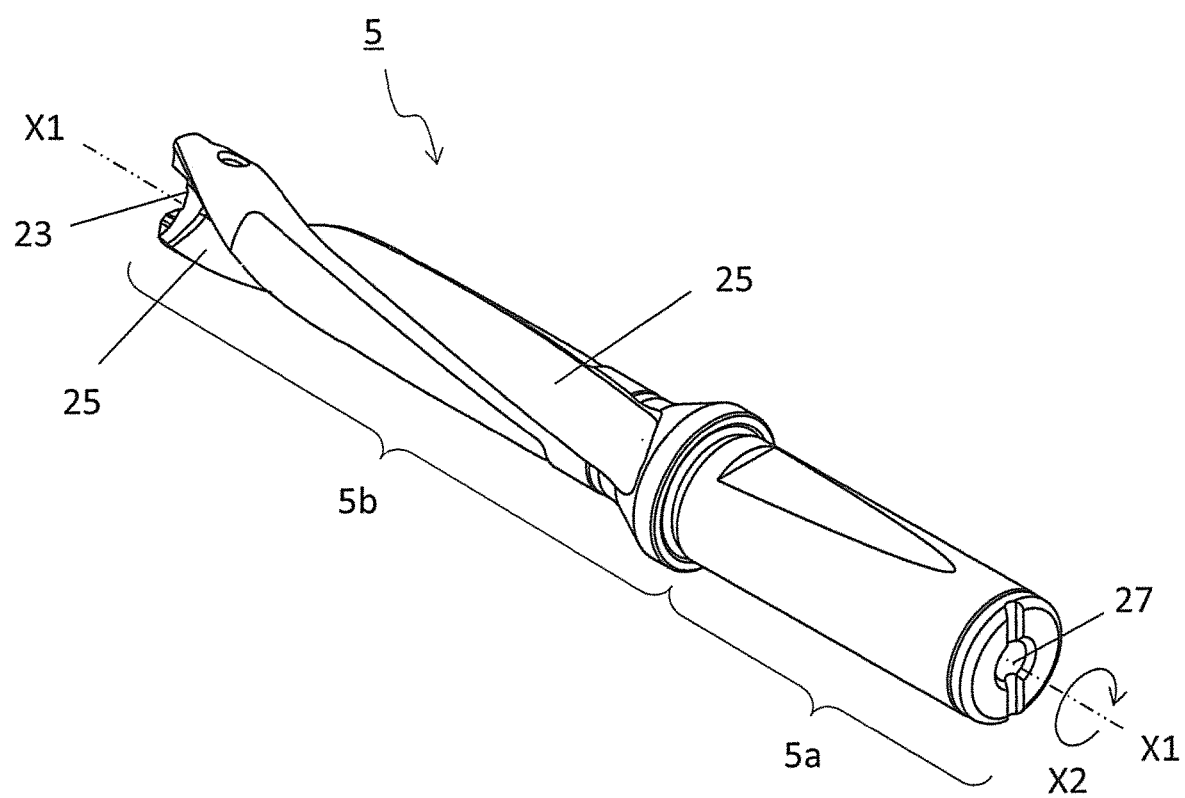
FIG. 14 is a perspective view illustrating a holder constituting the cutting tool in a non-limiting aspect of the present disclosure.

The holder 5 has, for example, a bar shape extending narrow and long along the rotation axis X1 as illustrated in FIGS. 1 and 14. The holder 5 in a non-limiting aspect of the present disclosure includes a segment called a shank 5a and designed to be held by, for example, a spindle rotated in a tool machine not particularly illustrated, and a segment called a body 5b located closer to a side of the first end than the former segment.

The holder 5 in a non-limiting aspect of the present disclosure further includes a pocket 23 located at a side of the first end. The pocket 23 is a portion that permits attachment of the insert 3 and opens into a side of the first end of the holder 5. The insert 3 is located at the pocket 23 in a non-limiting aspect of the present disclosure. The insert 3 may be in direct contact with the pocket 23. Alternatively, a sheet not particularly illustrated may be held between the insert 3 and the pocket 23. The insert 3 is designed to be attachable and detachable with respect to the holder 5.

A pair of flutes 25 are located in an outer periphery of the body 5b in the holder 5. An end portion at a side of the first end in each of the pair of flutes 25 connects to the rake surface in the insert 3 and extends spirally around the rotation axis X1 in a direction toward the segment.

The flutes 25 in a non-limiting aspect of the present disclosure are used for discharging chips flowing through the rake surface to the outside. The pair of flutes 25 are therefore generally called chip discharge flutes. Here, the pair of flutes 25 are formed only in the body 5b without being formed in the shank 5a, in order that the holder 5 is stably held by the tool machine. Examples of material of the holder 5 include metal, cemented carbide, and cermet.

The holder 5 further includes a second flow path 27 designed to permit passage of the coolant therethrough. The second flow path 27 is located inside the holder 5 and extends from a side of the first end toward a side of the second end in the holder 5. The second flow path 27 extends from a side of the second end toward a side of the first end along a flow of the coolant. The second flow path 27 connects to the first flow path 13, and the coolant is supplied through the second flow path 27 to the first flow path 13. One or a plurality of second flow paths 27 may be included.

While the cutting tools 1 of various non-limiting aspects of the present disclosure have been illustrated above, the present invention is not limited thereto. It is, of course, possible to make any arbitrary ones in so far as they do not depart from the gist of the present invention. For example, even though the cutting tools 1 of a non-limiting aspect of the present disclosure may be a drill, the cutting tools 1 may be, for example, an end mill or a reamer.

The cutting tools 1 of the above non-limiting aspects of the present disclosure are the indexable insert drill 1 constituted by the holder 5 and the insert 3 attachable and detachable with respect to the holder 5. Alternatively, the cutting tools 1 may be so-called solid drills in which the holder 5 is integrated with the insert 3. In the solid drills, the insert 3 is configured to include a segment corresponding to the holder 5. Still alternatively, the insert may be constituted only by the second region 21 in the above non-limiting aspects of the present disclosure, and the holder may have such a configuration that the first region 19 in the above non-limiting aspects of the present disclosure is integrated with the holder 5.

<Method of Manufacturing Machined Product>

A method of manufacturing a machined product in a non-limiting aspect of the present disclosure is described in detail below by illustrating the case of using the drills of the above non-limiting aspects of the present disclosure with reference to FIGS. 15 to 17.

The method of manufacturing a machined product in a non-limiting aspect of the present disclosure includes the following steps (1) to (4).

Figure 15:
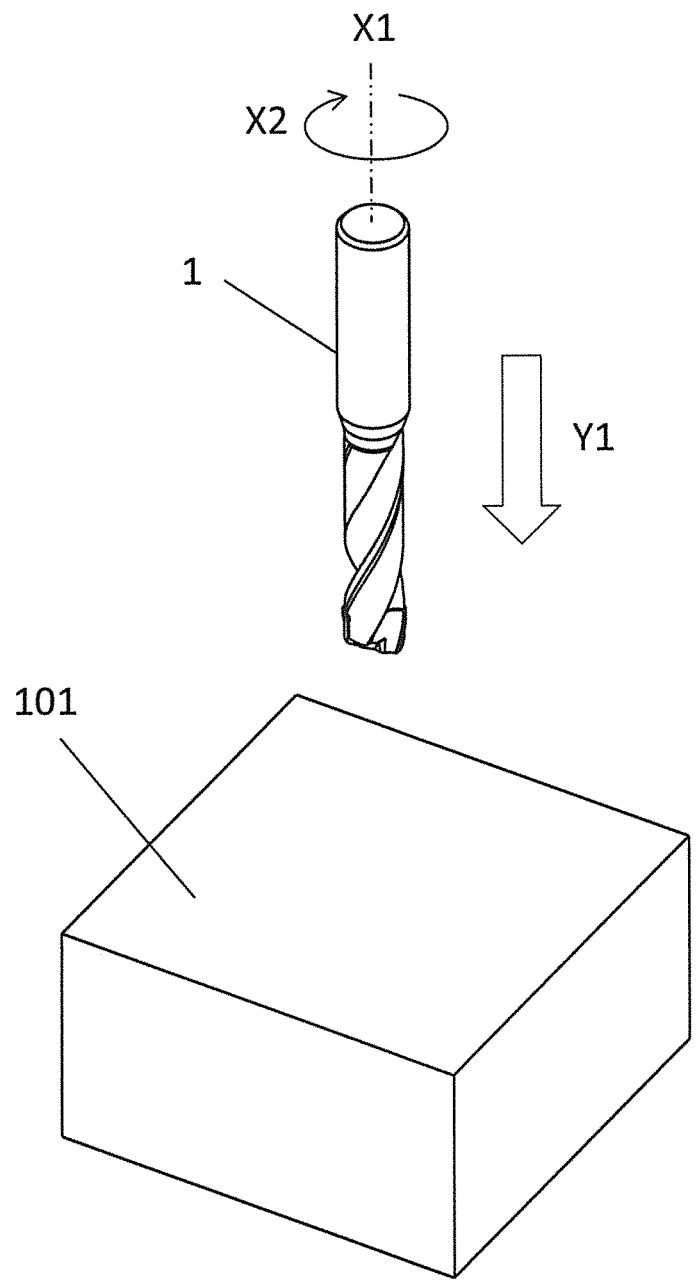
FIG. 15 is a schematic diagram illustrating a step in a method of manufacturing a machined product in a non-limiting aspect of the present disclosure.

(1) The step is to put the drill above a prepared workpiece 101 (refer to FIG. 15).

Figure 16:
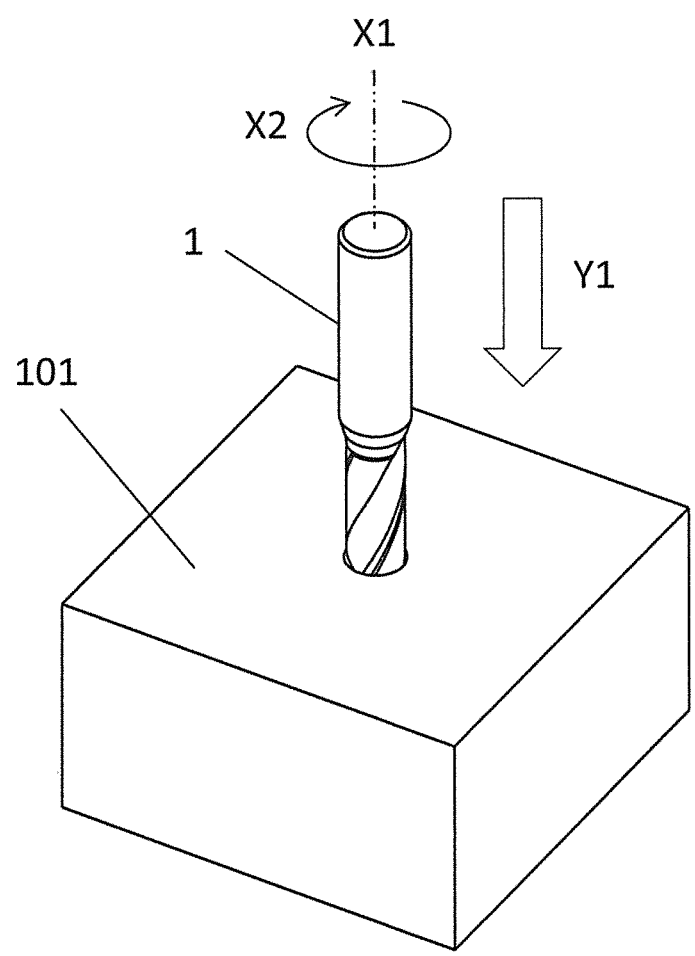
FIG. 16 is a schematic diagram illustrating a step in a method of manufacturing a machined product in a non-limiting aspect of the present disclosure.

(2) The step is to bring the drill near the workpiece 101 in Y1 direction by rotating the drill around the rotation axis X1 in a direction of arrow X2 (refer to FIGS. 15 and 16).

The above step can be carried out, for example, by fixing the workpiece 101 onto a table for a machine tool with the drill attached thereto, and by bringing the drill being rotated near the workpiece. In the above step, the workpiece 101 and the drill approach each other. For example, the workpiece 101 may be brought near the drill.

(3) The step is to form a drilled hole (through hole) 103 in the workpiece 101 by bringing the drill nearer the workpiece 101 in order to cause the cutting edge of the drill being rotated to come into contact with a desired position of a surface of the workpiece 101 (refer to FIG. 16).

In a non-limiting aspect of the present disclosure of the above step, a portion at a side of the second end in the second segment in the holder may be designed to not penetrate the workpiece 101, from the viewpoint of obtaining a good finished surface. That is, by causing the above portion to function as a margin region for discharging chips, excellent chip discharge performance is achievable through the region.

Figure 17:
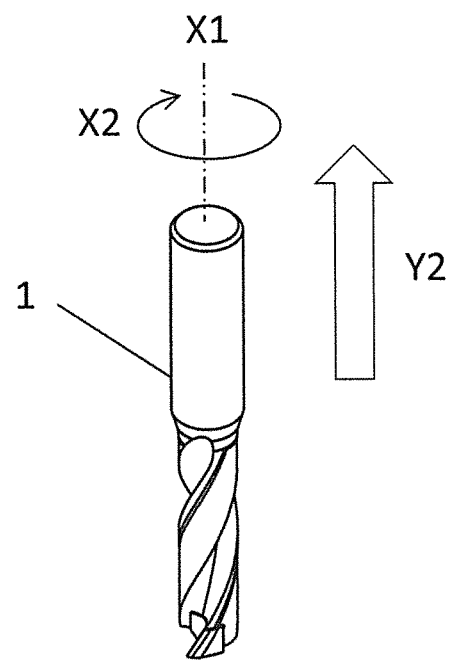
FIG. 17 is a schematic diagram illustrating a step in a method of manufacturing a machined product in a non-limiting aspect of the present disclosure.
Figure 17:
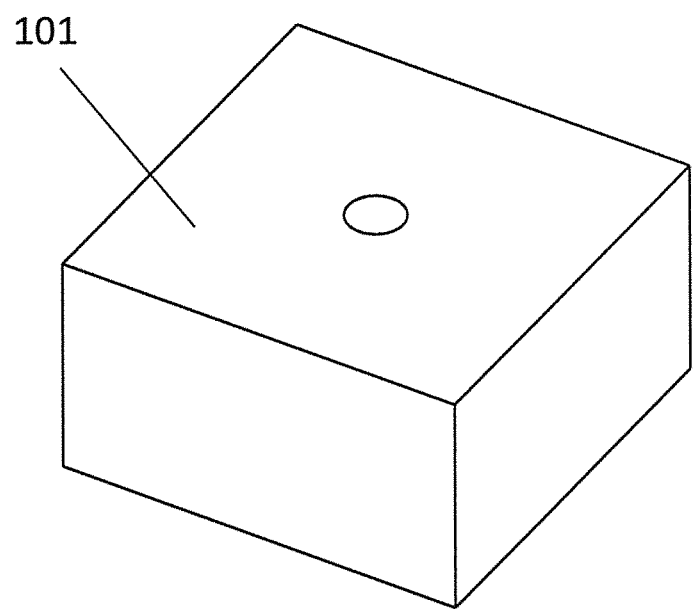

(4) The step is to move the drill away from the workpiece 101 in Y2 direction (refer to FIG. 17).

Also in this step, the workpiece 101 and the drill separate from each other as in the case of the above step (2). For example, the workpiece 101 may be moved away from the drill.

Excellent machining properties is attainable through the foregoing steps.

When the cutting process for the workpiece 101 as described above is carried out a plurality of times, specifically, when forming a plurality of machined holes 103 in the single workpiece 101, the step of bringing the cutting edge of the drill into contact with different portions of the workpiece 101 is repeated, while the drill is kept rotating.

DESCRIPTION OF THE REFERENCE NUMERALS 1 cutting tool (drill, indexable insert drill)
3 insert
5 holder
5a shank
5b body
7 cutting edge
9 first cutting edge
11 second cutting edge
13 first flow path
15 first inlet port
17 first outlet port
19 first region
21 second region
23 pocket
25 flute
27 second flow path
101 workpiece

What is claimed is:

1. A cutting tool, comprising:
a circular columnar body extending from a first end to a second end along a rotation axis, at least a part of the columnar body corresponds to an insert comprising a cutting edge at the first end, wherein
the insert comprises therein a flow path extending from a side of the first end toward a side of the second end, a width of the flow path along a radial direction of the circular columnar body is smaller than a width of the flow path along a circumferential direction of the circular columnar body in a cross section orthogonal to the rotation axis, the insert comprises a first region including the rotation axis and lying along the rotation axis, and a second region covering the first region, an outer diameter of the first region at a side of the second end is greater than an outer diameter of the first region at a side of the first end, an outer diameter of the first region increases as going from a side of the first end toward a side of the second end, the insert comprises a pair of the flow paths located point symmetrically on a basis of the rotation axis, and a distance between the pair of flow paths becomes smaller at a side of the first end than at a side of the second end.

2. The cutting tool according to claim 1, wherein an outer diameter of the second region is constant from a side of the second end toward a side of the first end in a part including the first region in a direction along the rotation axis.

3. The cutting tool according to claim 1, wherein the flow path is located between the first region and the second region, and a contour of the flow path in the first region is greater than a contour of the flow path in the second region in a cross section orthogonal to the rotation axis.

4. The cutting tool according to claim 1, wherein the flow path comprises a first portion located at a side of the rotation axis and having a concave curved surface shape, and a second portion intersecting with the first portion and having a concave curved surface shape located at a side of an outer periphery of the insert in a cross section orthogonal to the rotation axis, and a radius of curvature of the first portion is smaller than a radius of curvature of the second portion.

5. A method of manufacturing a machined product, comprising:

rotating the cutting tool according to claim 1;

bringing the cutting tool being rotated into contact with a workpiece; and moving the cutting tool away from the workpiece.

6. A cutting tool, comprising:

a circular columnar body extending from a first end to a second end along a rotation axis, at least a part of the columnar body corresponds to an insert comprising a cutting edge at the first end, wherein the insert comprises therein a flow path extending from a side of the first end toward a side of the second end, a width of the flow path along a radial direction of the circular columnar body is smaller than a width of the flow path along a circumferential direction of the circular columnar body in a cross section orthogonal to the rotation axis, the insert comprises a first region including the rotation axis and lying along the rotation axis, and a second region covering the first region, an outer diameter of the first region at a side of the second end is greater than an outer diameter of the first region at a side of the first end, and an outer diameter of the second region is constant from a side of the second end toward a side of the first end in a part including the first region in a direction along the rotation axis.

7. The cutting tool according to claim 6, wherein an outer diameter of the first region increases as going from a side of the first end toward a side of the second end.

8. The cutting tool according to claim 6, wherein the flow path is located between the first region and the second region, and a contour of the flow path in the first region is greater than a contour of the flow path in the second region in a cross section orthogonal to the rotation axis.

9. The cutting tool according to claim 6, wherein the flow path comprises a first portion located at a side of the rotation axis and having a concave curved surface shape, and a second portion intersecting with the first portion and having a concave curved surface shape located at a side of an outer periphery of the insert in a cross section orthogonal to the rotation axis, and a radius of curvature of the first portion is smaller than a radius of curvature of the second portion.

10. A method of manufacturing a machined product, comprising:

rotating the cutting tool according to claim 6;

bringing the cutting tool being rotated into contact with a workpiece; and moving the cutting tool away from the workpiece.

11. A cutting tool, comprising:

a circular columnar body extending from a first end to a second end along a rotation axis, at least a part of the columnar body corresponds to an insert comprising a cutting edge at the first end, wherein the insert comprises therein a flow path extending from a side of the first end toward a side of the second end, a width of the flow path along a radial direction of the circular columnar body is smaller than a width of the flow path along a circumferential direction of the circular columnar body in a cross section orthogonal to the rotation axis, the insert comprises a first region including the rotation axis and lying along the rotation axis, and a second region covering the first region, an outer diameter of the first region at a side of the second end is greater than an outer diameter of the first region at a side of the first end, the flow path is located between the first region and the second region, and a contour of the flow path in the first region is greater than a contour of the flow path in the second region in a cross section orthogonal to the rotation axis.

12. The cutting tool according to claim 11, wherein an outer diameter of the first region increases as going from a side of the first end toward a side of the second end.

13. The cutting tool according to claim 12, wherein an outer diameter of the second region is constant from a side of the second end toward a side of the first end in a part including the first region in a direction along the rotation axis, the insert comprises a pair of the flow paths located point symmetrically on a basis of the rotation axis, and a distance between the pair of flow paths becomes smaller at a side of the first end than at a side of the second end.

14. The cutting tool according to claim 11, wherein the flow path comprises a first portion located at a side of the rotation axis and having a concave curved surface shape, and a second portion intersecting with the first portion and having a concave curved surface shape located at a side of an outer periphery of the insert in a cross section orthogonal to the rotation axis, and a radius of curvature of the first portion is smaller than a radius of curvature of the second portion.

15. A method of manufacturing a machined product, comprising:
rotating the cutting tool according to claim 11;
bringing the cutting tool being rotated into contact with a workpiece; and
moving the cutting tool away from the workpiece.

* * * * *